(12) United States Patent
Song et al.

(10) Patent No.: US 12,118,423 B2
(45) Date of Patent: Oct. 15, 2024

(54) METHOD, APPARATUS, AND SYSTEM FOR TESTING TERMINAL

(71) Applicant: SHENZHEN ZOLON TECHNOLOGY CO., LTD., Shenzhen (CN)

(72) Inventors: Kunxian Song, Shenzhen (CN); Renchi Zheng, Shenzhen (CN); Xiuliang Chen, Shenzhen (CN); Xiaoyu Huang, Shenzhen (CN)

(73) Assignee: SHENZHEN ZOLON TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/769,080

(22) PCT Filed: Mar. 18, 2020

(86) PCT No.: PCT/CN2020/079920
§ 371 (c)(1),
(2) Date: Apr. 14, 2022

(87) PCT Pub. No.: WO2020/192520
PCT Pub. Date: Oct. 1, 2020

(65) Prior Publication Data
US 2024/0104313 A1    Mar. 28, 2024

(30) Foreign Application Priority Data
Mar. 27, 2019  (CN) .......................... 201910238115.7

(51) Int. Cl.
G06K 7/00        (2006.01)
(52) U.S. Cl.
CPC .................. G06K 7/0095 (2013.01)

(58) Field of Classification Search
CPC ..... G06Q 20/204; G06K 7/0095; G06F 11/00
See application file for complete search history.

(56) References Cited

U.S. PATENT DOCUMENTS 8,626,591 B2 *  1/2014  Ablowitz ............... G06Q 20/20
                                                       705/52
9,697,452 B2 *  7/2017  Itay .................... H04M 1/72409
(Continued)

FOREIGN PATENT DOCUMENTS

CN    101651713 A    2/2010
CN    106372898 A    2/2017
(Continued)

OTHER PUBLICATIONS

International Search Report issued on Jun. 24, 2020 in corresponding International application No. PCT/CN2020/079920; 5 pages.

*Primary Examiner* — Daniel I Walsh
(74) *Attorney, Agent, or Firm* — Maier & Maier, PLLC

(57) ABSTRACT

A method, an apparatus, and a system for testing a terminal. The method includes: receiving a smart card switching instruction; acquiring a card channel identifier from the smart card switching instruction; switching a connected-card channel to a target card channel corresponding to the card channel identifier when the target card channel corresponding to the card channel identifier is a contactless card channel; receiving a data request for a terminal test; acquiring, through a first relay repeater, response data in response to the data request, from a smart card to be tested within the target card channel; and sending, through a second relay repeater, the response data to the terminal whereby accomplishing the terminal test.

14 Claims, 11 Drawing Sheets

(56) References Cited

U.S. PATENT DOCUMENTS

| | | | |
|---|---|---|---|
| 10,262,174 B1* | 4/2019 | Kinder | G06K 7/0073 |
| 10,846,490 B1* | 11/2020 | Tantiwuttipong | G07F 7/088 |
| 11,429,799 B1* | 8/2022 | Chen | G06K 7/0095 |
| 2005/0034028 A1* | 2/2005 | Son | G06K 7/10465 |
| | | | 714/43 |
| 2005/0077357 A1* | 4/2005 | Roux | G06K 7/10465 |
| | | | 235/451 |
| 2005/0088167 A1* | 4/2005 | Miller | H03H 11/265 |
| | | | 324/754.07 |
| 2006/0267611 A1* | 11/2006 | Corcoran | G01R 31/319 |
| | | | 324/754.1 |
| 2008/0315902 A1* | 12/2008 | Kobayashi | G11C 5/143 |
| | | | 324/756.03 |
| 2009/0235037 A1* | 9/2009 | Mounier | G07F 7/1008 |
| | | | 711/E12.001 |
| 2010/0038424 A1* | 2/2010 | Bashan | G06K 7/0095 |
| | | | 235/439 |
| 2010/0213960 A1* | 8/2010 | Mok | G01R 35/00 |
| | | | 324/762.03 |
| 2011/0042465 A1* | 2/2011 | Smets | G06K 7/0095 |
| | | | 235/492 |
| 2012/0214473 A1* | 8/2012 | Li | H04W 24/06 |
| | | | 455/419 |
| 2012/0274349 A1* | 11/2012 | Hu | G06F 11/263 |
| | | | 324/763.01 |
| 2013/0067279 A1* | 3/2013 | Ge | G06F 11/2273 |
| | | | 714/E11.17 |
| 2013/0098984 A1* | 4/2013 | Shenker | G06K 7/01 |
| | | | 235/375 |
| 2013/0240625 A1 | 9/2013 | Hsu | |
| 2016/0103716 A1* | 4/2016 | Chai | G06F 21/74 |
| | | | 719/319 |
| 2016/0345440 A1* | 11/2016 | Kasagani | H01L 21/56 |
| 2017/0185811 A1 | 6/2017 | Hoson | |
| 2018/0113774 A1* | 4/2018 | Kyzlink | G01R 31/2834 |
| 2018/0253572 A1* | 9/2018 | Ryan | G06K 7/0095 |
| 2019/0065792 A1* | 2/2019 | Fenton | G06K 13/12 |
| 2019/0156072 A1* | 5/2019 | Johnson | G06Q 20/204 |
| 2022/0194775 A1* | 6/2022 | Friedel | G06Q 20/3278 |
| 2024/0029525 A1* | 1/2024 | Masanam | G07G 1/12 |
| 2024/0054067 A1* | 2/2024 | Fu | G07G 1/12 |
| 2024/0104313 A1* | 3/2024 | Song | G06K 7/0095 |
| 2024/0232845 A1* | 7/2024 | Wilk, Jr. | G06Q 20/208 |

FOREIGN PATENT DOCUMENTS

| | | |
|---|---|---|
| CN | 106547691 A | 3/2017 |
| CN | 106934310 A | 7/2017 |
| CN | 107172577 A | 9/2017 |
| CN | 108563968 A | 9/2018 |
| CN | 207817887 U | 9/2018 |
| EP | 3333756 A1 | 6/2018 |
| WO | 2019103919 A1 | 5/2019 |

* cited by examiner

METHOD, APPARATUS, AND SYSTEM FOR TESTING TERMINAL

TECHNICAL FILED

The present application relates to the technical field of testing, and more particularly to a method, an apparatus, and a system for testing a terminal.

BACKGROUND

With the continuous development of Internet technology, more and more merchants use a point of sale (POS) machine, also known as a sale terminal, to charge fees, and users only need to insert the smart cards into the POS machine or place the smart cards within an induction area of the POS machine to complete the payment.

The POS machine is a multi-functional terminal with functions such as support for consumption, pre-authorization, balance inquiry, and transfer. During the research and development process of the POS machine, multiple smart cards need to be used to test the POS machine. In the traditional POS machine testing solutions, a robot arm is usually used in the testing to switch the smart cards to allow the POS machine to reading and writing data. However, in the process of switching the smart cards, the robotic arm needs to constantly insert or pull out the smart cards into/from the POS machine, or move the smart cards, which wastes a lot of time and results in low test efficiency.

SUMMARY

In view of the above-described technical problems, it is necessary to provide a method, an apparatus, and a system for testing a terminal, which can improve the testing efficiency.

A method for testing a terminal, comprises:
receiving a smart card switching instruction;
acquiring a card channel identifier from the smart card switching instruction;
switching a connected-card channel to a target card channel corresponding to the card channel identifier when the target card channel corresponding to the card channel identifier is a contactless card channel;
receiving a data request for a terminal test;
acquiring, through a first relay repeater, response data in response to the data request, from a smart card to be tested within the target card channel; and
sending, through a second relay repeater, the response data to the terminal whereby accomplishing the terminal test.

An apparatus for testing a terminal, comprises:
a switch receiver module, configured for receiving a smart card switching instruction;
an identifier acquisition module, configured for acquiring a card channel identifier from the smart card switching instruction;
a channel switching module, configured for switching a connected-card channel to a target card channel corresponding to the card channel identifier when the target card channel corresponding to the card channel identifier is a contactless card channel;
a request receiver module, configured for receiving a data request for a terminal test;
a data acquisition module, configured for acquiring, through a first relay repeater, response data in response to the data request, from a smart card to be tested within the target card channel; and
a data sending module, configured for sending, through a second relay repeater, the response data to the terminal whereby accomplishing the terminal test.

A system for testing a terminal, comprises: a terminal, a master controller, a first repeater, and a second repeater.

The terminal is configured for: sending a smart card switching instruction and a data request for terminal test.

The master controller is configured for: receiving the smart card switching instruction; acquiring a card channel identifier from the smart card switching instruction; switching a connected-card channel to a target card channel corresponding to the card channel identifier when the target card channel corresponding to the card channel identifier is a contactless card channel; and receiving a data request for a terminal test.

The first relay repeater is configured for: acquiring response data in response to the data request, from a smart card to be tested within the target card channel, and sending the response data to the master controller.

The second relay repeater is configured for: sending the response data forwarded by the master controller to the terminal whereby accomplishing the terminal test.

A computer device, comprises: a memory; a processor; and a computer program, stored by the memory and running on the processor, and configured for implementing the following steps when being executed by the processor:
receiving a smart card switching instruction;
acquiring a card channel identifier from the smart card switching instruction;
switching a connected-card channel to a target card channel corresponding to the card channel identifier when the target card channel corresponding to the card channel identifier is a contactless card channel;
receiving a data request for a terminal test;
acquiring, through a first relay repeater, response data in response to the data request, from a smart card to be tested within the target card channel; and
sending, through a second relay repeater, the response data to the terminal whereby accomplishing the terminal test.

A computer-readable storage medium, storing a computer program, configured for configured for implementing the following steps when being executed by the processor:
receiving a smart card switching instruction;
acquiring a card channel identifier from the smart card switching instruction;
switching a connected-card channel to a target card channel corresponding to the card channel identifier when the target card channel corresponding to the card channel identifier is a contactless card channel;
receiving a data request for a terminal test;
acquiring, through a first relay repeater, response data in response to the data request, from a smart card to be tested within the target card channel; and
sending, through a second relay repeater, the response data to the terminal whereby accomplishing the terminal test.

In the above method, apparatus, and system for testing a terminal, the card channel identifier is obtained from the received smart card switching instruction. The card channel identifier corresponds to a certain card channel, and in each the card channel is placed one smart card. When the target card channel corresponding to the card channel identifier is the contactless card channel, the connected-card channel is automatically switched to the target card channel corresponding to the card channel identifier. During the switching of the smart card, the smart card can be automatically switched without moving the card, thus saving the time required for switching the smart card. After the switching is completed, the data request for the terminal test is received, response data in response to the data request is read through a first relay repeater from a smart card to be tested within the target card channel, and then, the acquired response data is sent through the second relay repeater to the terminal. In this way, the data interaction between the terminal and the smart card to be tested is realized and the test task is therefore accomplished. Since the operations of inserting and removing the card are not required during the test process, the test time is effectively reduced, and the test efficiency is greatly improved.

DETAILED DESCRIPTION OF THE EMBODIMENTS

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application.

Figure 1:
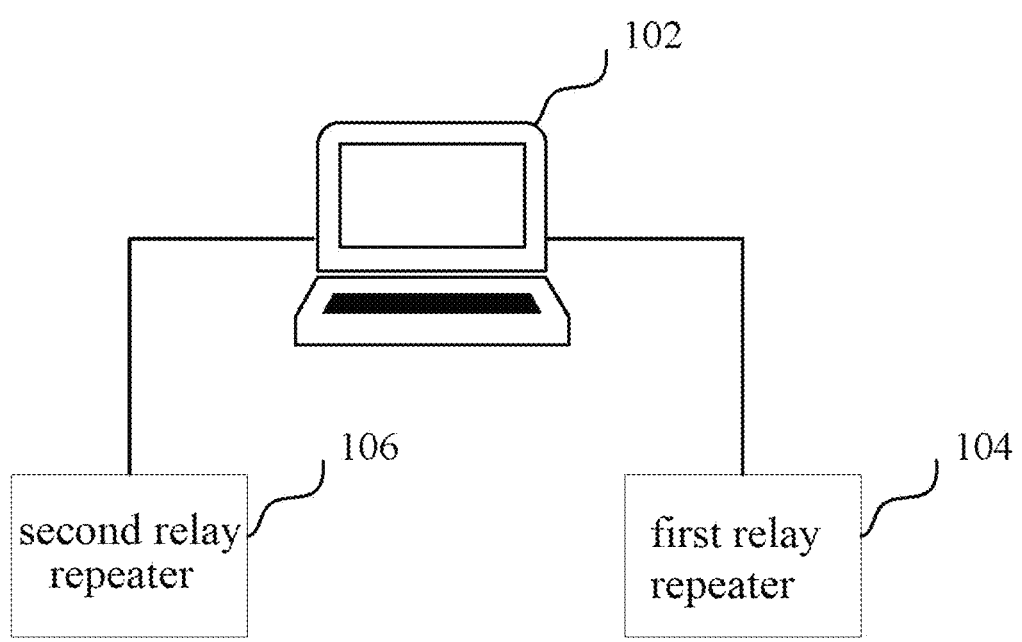
FIG. 1 is a schematic diagram showing application environment for a method for testing a terminal according to an embodiment of the present application.

The present application provides a method for testing a terminal, which can be applied to the application environment as shown in FIG. 1. A master controller 102 communicates with a first relay repeater 104 and a second relay repeater 106 through serial ports. The master controller 102 can be, but not limited to, various industrial computers, personal computers, and notebook computers. The first relay repeater can interact with a contactless smart card via near field communication (NFC) technology. The second relay repeater can interact with a contactless card reading area of the terminal via the NFC technology. The contactless card reading area can be an NFC card reader.

Figure 2:
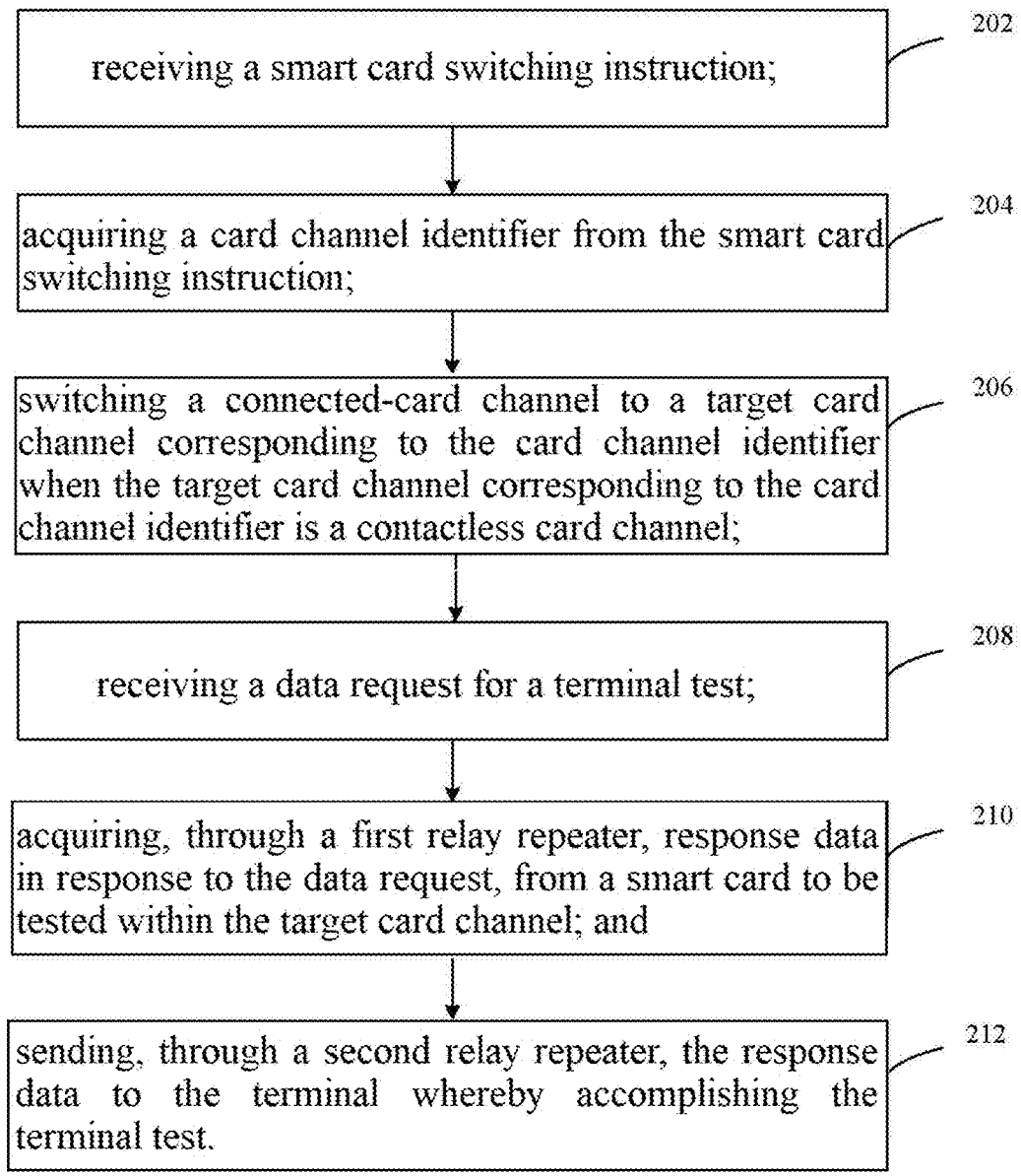
FIG. 2 is a schematic flowchart of a method for testing a terminal according to an embodiment of the present application.

In an embodiment, as shown in FIG. 2, a method for testing a terminal is provided. The method is applied to a master controller 102 shown in FIG. 1 as an example for explanation, and includes steps 202, 204, 206, 208, 210, and 212.

In step 202, a smart card switching instruction is received.

The smart card switching instruction may be an instruction configured for instructing the master controller to switch the smart card. The smart card, also known as an integrated circuit (IC) card, is a card obtained by embedding a microelectronic chip into the card substrate. The smart card may be divided into a contact smart card and a contactless smart card. The smart card can be a bank card, and the bank card can be an Europay MasterCard Visa (EMV) card that conforms to the EMV standard, which is a technical standard for the transfer of bank cards from magnetic stripe cards to smart cards and is jointly initiated and formulated by the three major international bank card organizations, that is, the Europay, MasterCard, and Visa.

In particular, a smart card switching instruction is generated by the terminal in the terminal testing system, and then sent to the master controller in the terminal testing system through the network or the serial port. The smart card switching instruction sent by the terminal is then received by the master controller.

In an embodiment, the terminal may be a point of sale (POS) machine. The POS machine may be a traditional POS machine or a smart POS machine. The POS machine may support the contact smart card or the contactless smart card.

In an embodiment, the master controller receives a smart card switching instruction from a host computer. The host computer is configured to generate the smart card switching instruction and send the smart card switching instruction to the master controller. The host computer can be a terminal, that is, a POS machine, or a third-party computer.

In step 204, a card channel identifier is acquired from the smart card switching instruction.

The card channel identifier is an identifier for a card channel, which can be the number of the card channel. The number of the card channel can be a string of a combination of letters, numbers, special symbols, and the like. The card channel may be a circuit structure in which a smart card is placed.

In particular, the master controller is configured for parsing the smart card switching instruction, and obtaining the card channel identifier from the smart card switching instruction after being parsed. Multiple card channels are provided in the terminal testing system. Each card channel has a unique card channel identifier, and in each the card channel is placed one smart card.

The card channel includes: a contactless card channel and a contact card channel. The smart card placed in the contactless card channel is the contactless smart card, and the smart card placed in the contact card channel is the contact smart card. The contactless smart card, also known as a radio frequency card, is cable to realize data interaction with a reader transmission of radio waves within a certain range, without requiring a physical contact with a surface of the card reader. The contact smart card is a smart card that requires a physical contact with the surface of the card reader in order to achieve data interaction with the card reader.

In an embodiment, a plurality of card channel identifiers is pre-stored in the master controller. After receiving a smart card switching instruction, the master controller obtains a card channel identifier from the plurality of card channel identifiers according to a preset acquisition method for the card channel identifier.

In step 206, when the target card channel corresponding to the card channel identifier is a contactless card channel, a connected-card channel is switched to a target card channel corresponding to the card channel identifier.

The connected-card channel can be a card channel that is already connected with the master controller currently. The target card channel can be a card channel corresponding to the card channel identifier.

In particular, it can be distinguished from the card channel identifier whether a card channel is a contactless card channel or a contact card channel, and the card channel identifier may also uniquely characterize a certain card channel in the terminal testing system. When it is determined by the master controller that a target card channel corresponding to a card channel identifier is a contactless card channel, a contactless card channel switching instruction is triggered. The master controller controls the contactless switching circuit according to the contactless card channel switching instruction to switch the connected-card channel to the target card channel corresponding to the card channel identifier.

In an embodiment, it is determined by the master controller firstly according to the card channel identifier either a contactless card channel or a contact card channel is to be switched to, and then according to the card channel identifier, the connected-card channel is switched to the target card channel corresponding to the card channel identifier.

In step 208, a data request for a terminal test is received.

The data request may be a request for data interaction with a smart card to be tested within the card channel.

In particular, after the connected-card channel is switched by master controller to the target card channel corresponding to the card channel identifier, a data request for a terminal test is generated by the terminal, and the generated data request can be sent through the network or the serial port to the master controller. The data request sent by the terminal is then received by the master controller.

In an embodiment, the data request may be at least one of operations such as payment, pre-authorization, balance inquiry, and transfer.

In step 210, response data in response to the data request is acquired through a first relay repeater from a smart card to be tested within the target card channel.

The first relay repeater is a component configured for data interaction with the contactless smart card in the terminal testing system. The response data can be data obtained by the first relay repeater from the smart card to be tested according to the data request.

In particular, the first relay repeater exists in the contactless card channel, and the smart card to be tested is the contactless smart card and is placed in the card channel corresponding to the first relay repeater. After the data request is received by the master controller, the data request is sent by the master controller to the first relay repeater within the target card channel. The response data is acquired by the first relay repeater from the smart card to be tested and then sent to the master controller. The response data sent from the first relay repeater is received by the master controller.

In step 212, the response data is sent through a second relay repeater to the terminal whereby accomplishing the terminal test.

The second relay repeater is a component configured for data interaction with the terminal in the terminal testing system.

In particular, after the e response data is acquired by the master controller from the first relay repeater, the response data is sent to the second relay repeater. The second relay repeater receives the response data sent by the master controller, and sends the response data to the terminal. After the terminal receives the response data, the terminal test is completed.

In an embodiment, after the response data is sent from the master controller to the terminal through the second relay repeater to complete a current round of terminal testing, a new smart card switching instruction is regenerated by the terminal and sent to the master controller, in order to perform a next round of terminal testing.

In this embodiment, the card channel identifier is obtained from the received smart card switching instruction. The card channel identifier corresponds to a certain card channel, and in each the card channel is placed one smart card. When the target card channel corresponding to the card channel identifier is the contactless card channel, the connected-card channel is automatically switched to the target card channel corresponding to the card channel identifier. During the switching of the smart card, the smart card can be automatically switched without moving the card, thus saving the time required for switching the smart card. After the switching is completed, the data request for the terminal test is received, response data in response to the data request is read through a first relay repeater from a smart card to be tested within the target card channel, and then, the acquired response data is sent through the second relay repeater to the terminal. In this way, the data interaction between the terminal and the smart card to be tested is realized and the test task is therefore accomplished. Since the operations of inserting and removing the card are not required during the test process, the test time is effectively reduced, and the test efficiency is greatly improved.

Figure 3:
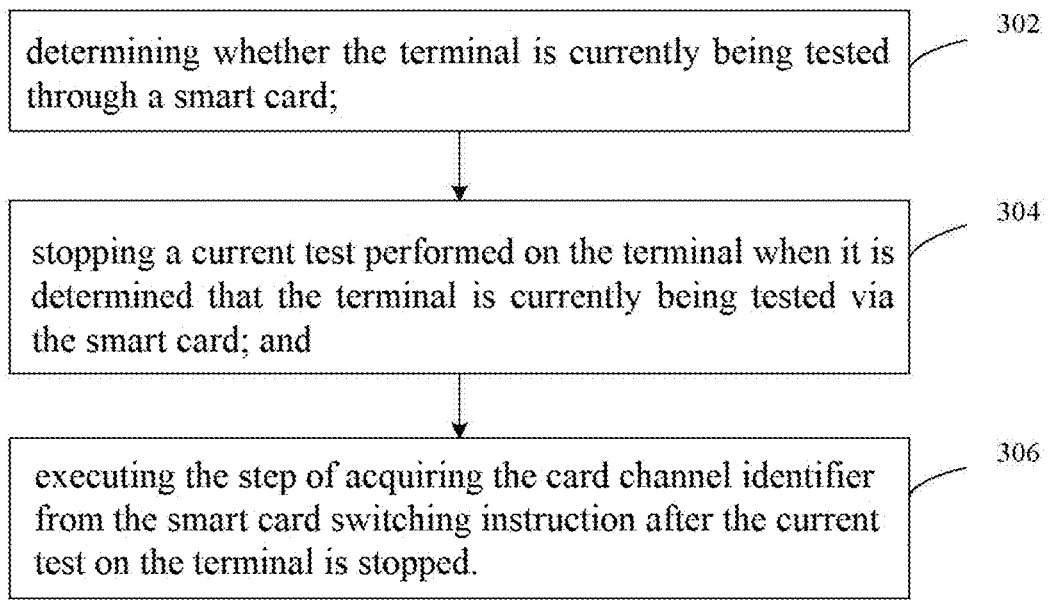
FIG. 3 is a schematic flowchart of a step of determining whether a terminal is currently being tested according to an embodiment of the present application.

As shown in FIG. 3, in an embodiment, the terminal testing method, after step 202, further comprises the step of determining whether the terminal is currently being tested, and such step specifically includes steps 302, 304, and 306.

In step 302, it is determined whether the terminal is currently being tested through a smart card.

In particular, when the smart card switching instruction is received by the master controller, the current process is firstly checked by the master controller, so as to determine whether the master controller is currently testing the terminal through the smart card.

In step 304, when it is determined that the terminal is currently being tested via the smart card, a current test performed on the terminal is stopped.

In particular, the instruction given by the terminal or the host computer has a highest priority. When it is determined by the master controller that the terminal is being tested through the smart card, a test stop instruction is triggered, and the current test performed on the terminal is stopped according to the test stop instruction.

In step 306, after the current test on the terminal is stopped, the card channel identifier is acquired from the smart card switching instruction.

In particular, when the current test performed on the terminal is stopped by the master controller, the card channel identifier is acquired from the smart card switching instruction acquired.

In an embodiment, when the smart card switching instruction is received by the master controller, and if the terminal is currently being tested by the master controller through the smart card, an interruption instruction is triggered, and the current test performed on the terminal is interrupted according to the interruption instruction. When the terminal testing is accomplished by the master controller according to the smart card switching instruction, the interrupted tested is returned and continued.

In this embodiment, after the smart card switching instruction is received, if the terminal is currently being tested, the current test is stopped, in order to execute the smart card switching instruction, in this way, the test efficiency is ensured and the lagging is avoided.

Figure 4:
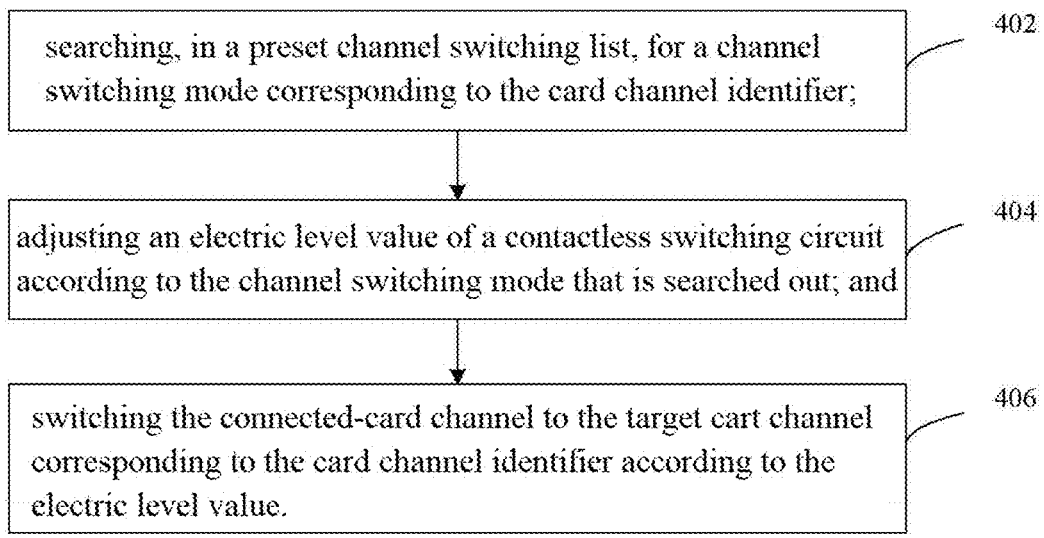
FIG. 4 is a schematic flowchart of a step of switching a connected-card channel according to an embodiment of the present application.

As shown in FIG. 4, in an embodiment, in particular, step 206 further comprises a step of switching the connected-card channel, which particularly includes steps 402, 404, and 406.

In step 402, a channel switching mode corresponding to the card channel identifier is searched for in a preset channel switching list.

The preset channel switching list can be a list that records modes for switching a connected-card channel. The channel switching mode can be the mode in which the connected-card channel is switched by the master controller to the target card channel.

In particular, the preset channel switching list is stored in the master controller, and the channel switching modes are recorded in the preset channel switching list. The stored preset channel switching list and the card channel identifier are obtained by the master controller, the obtained card channel identifier is searched in the preset channel switching list, and a channel switching mode corresponding to the card channel identifier searched is extracted.

In step 404, an electric level value of a contactless switching circuit is adjusted according to the channel switching mode that is searched out.

The contactless switching circuit may be a circuit in the terminal testing system configured for executing the switching to the contactless card channel.

In particular, the channel switching mode may be the mode in which the electric level value of the contactless switching circuit is adjusted by the master controller. After the channel switching mode corresponding to the card channel identifier is searched out by the master controller, the electric level value of a control terminal of the contactless switching circuit is adjusted according to the channel switching mode.

In step 406, the connected-card channel is switched to the target cart channel corresponding to the card channel identifier according to the electric level value.

In particular, after the electric level value in the contactless switching circuit is adjusted by the master controller, the connected-card channel is switched by the contactless switching circuit to the target card channel corresponding to the card channel identifier, according to the electric level value after being adjusted. That is, the master controller establishes a connection with the smart card to be tested in the target card channel.

In this embodiment, different card channel identifiers correspond to different channel switching modes. The channel switching modes may be based on the electric level value of the contactless switching circuit. The channel switching mode is searched out according to the card channel identifier, and then the electric level value of the contactless switching circuit is adjusted according to the channel switching mode. In this way, the connected-card channel can be accurately switched to the target card channel corresponding to the card channel identifier, thereby improving the switching accuracy of the connected-card channel.

Figure 5:
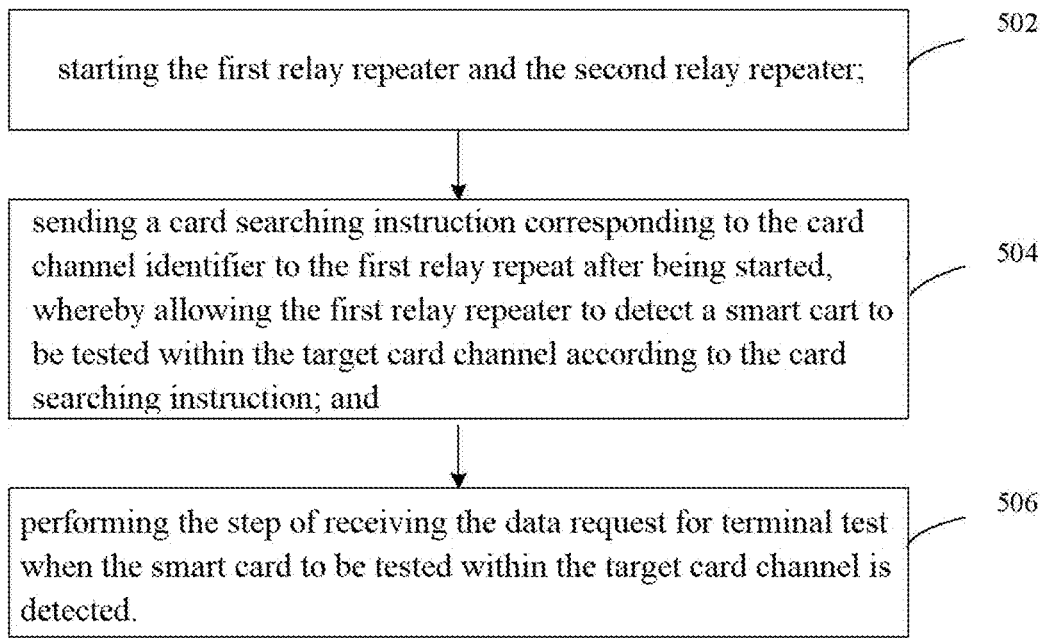
FIG. 5 is a schematic flowchart of a step of detecting a smart card according to an embodiment of the present application.

As shown in FIG. 5, in an embodiment, the terminal testing method, after step 206, further comprises a step of detecting the smart card, which particularly includes steps 502, 504, and 506.

In step 502, the first relay repeater and the second relay repeater are started.

The relay device protocol can be a protocol used by the first relay repeater and the second relay repeater for data transmission.

In particular, the first relay repeater and the second relay repeater in the terminal testing system are powered off when not working. After completing the switching of the connected-card channel, the master controller obtains the stored relay device protocol, powers up the first relay repeater and the second relay repeater, and sends the relay device protocol to the first relay repeater and the second relay repeater to start the first relay repeater and the second relay repeater.

In step 504, a card searching instruction corresponding to the card channel identifier is sent to the first relay repeat after being started, whereby allowing the first relay repeater to detect a smart cart to be tested within the target card channel according to the card searching instruction.

The card searching instruction is an instruction configured for instructing the first relay repeater to detect the smart card to be tested in the target card channel.

In particular, after starting the first relay repeater and the second relay repeater, the master controller generates the card searching instruction corresponding to the card channel identifier obtained, and sends the card searching instruction to the first relay repeater within the target card channel corresponding to the card channel identifier. After the first relay repeater receives the card searching instruction, the first relay repeater detects whether the smart card to be tested exists in the target card channel.

In an embodiment, the first relay repeater transmits a radio frequency signal into the target card channel, after receiving the card searching instruction. When the smart card to be tested exists in the target card channel and the smart card to be tested is the contactless smart card, the smart card to be tested returns the smart card identification to the first relay repeater according to the radio frequency signal, which means, the smart card to be tested existing in the target card channel is detected by the first relay repeater.

In step 506, when the smart card to be tested within the target card channel is detected, the data request for terminal test is received.

In particular, when detecting the smart card to be tested existing in the target card channel, the master controller generates detection success information and sends the detection success information to the terminal. The detection success information may include a smart card identifier of the smart card to be tested. After receiving the detection success information, the terminal generates a data request for terminal testing, and sends the data request to the master controller. The master controller receives data requests.

In this embodiment, the first relay repeater and the second relay repeater are started first, so that the terminal test can be performed normally. The card searching instruction corresponding to the card channel identifier is sent to the first relay repeater after being started, such that it is detected whether the smart card to be tested exists in the target card channel. When the presence of the smart card to be tested is detected, the data request is received, which ensures the normal operation of the terminal test.

Figure 6:
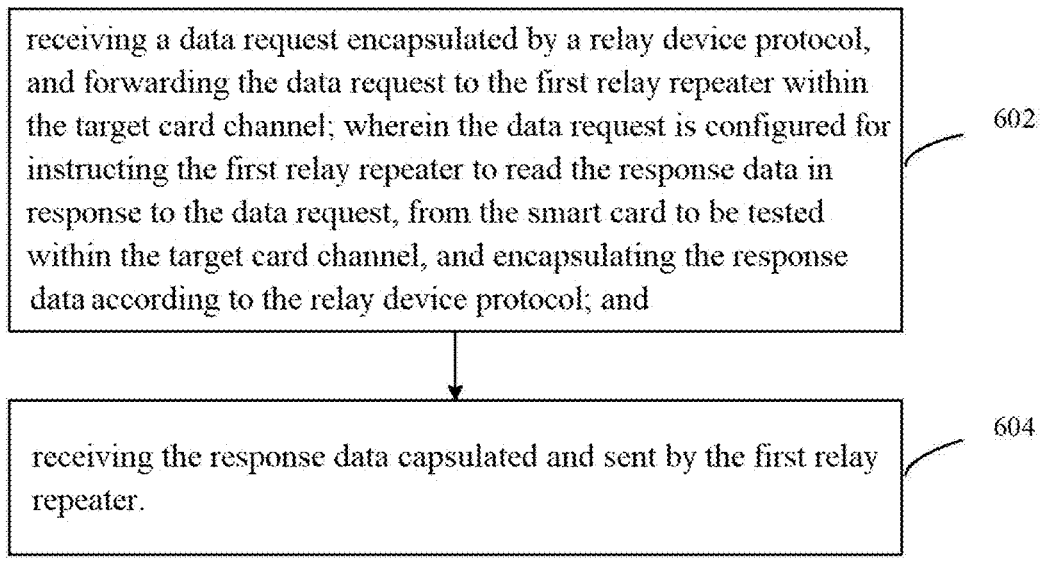
FIG. 6 is a schematic flowchart of a step of acquiring response data according to an embodiment of the present application.

As shown in FIG. 6, in an embodiment, in particular, the step 210 further includes a step of acquiring the response data, which particularly includes steps 602 and 604.

In step 602, a data request encapsulated by a relay device protocol is received and forwarded to the first relay repeater within the target card channel. The data request is configured for instructing the first relay repeater to read the response data in response to the data request, from the smart card to be tested within the target card channel, and encapsulating the response data according to the relay device protocol.

In particular, the first relay repeater and the second relay repeater can use the same relay device protocol in communication. That is, all the communication data received or sent by the first relay repeater and the second relay repeater (including but not limited to the smart card switching instruction, the card searching instruction, data requests, response data obtained from the contactless smart card, and data read from the contact smart card) are encapsulated according to the relay device protocol.

The master controller receives and forwards the data request encapsulated by the relay device protocol to the first relay repeater within the target card channel. The first relay repeater interacts with the smart card to be tested in the target card channel, and reads response data from the smart card to be tested according to the data request. After reading the response data, the first relay repeater obtains the relay device protocol and encapsulates the response data according to the relay device protocol.

In step 604, the response data capsulated and sent by the first relay repeater is received.

In particular, the first relay repeater encapsulates the response data according to the relay device protocol, and sends the encapsulated response data to the master controller. The master controller receives the encapsulated response data sent by the first relay repeater.

In this embodiment, after the data request encapsulated by the relay device protocol is sent to the first relay repeater in the target card channel, the first relay repeater reads the response data from the smart card to be tested in the target card channel according to the data request, encapsulates the response data according to the relay device protocol, and sends the encapsulated response data to the master controller, thus improving the efficiency of data transmission.

Figure 7:
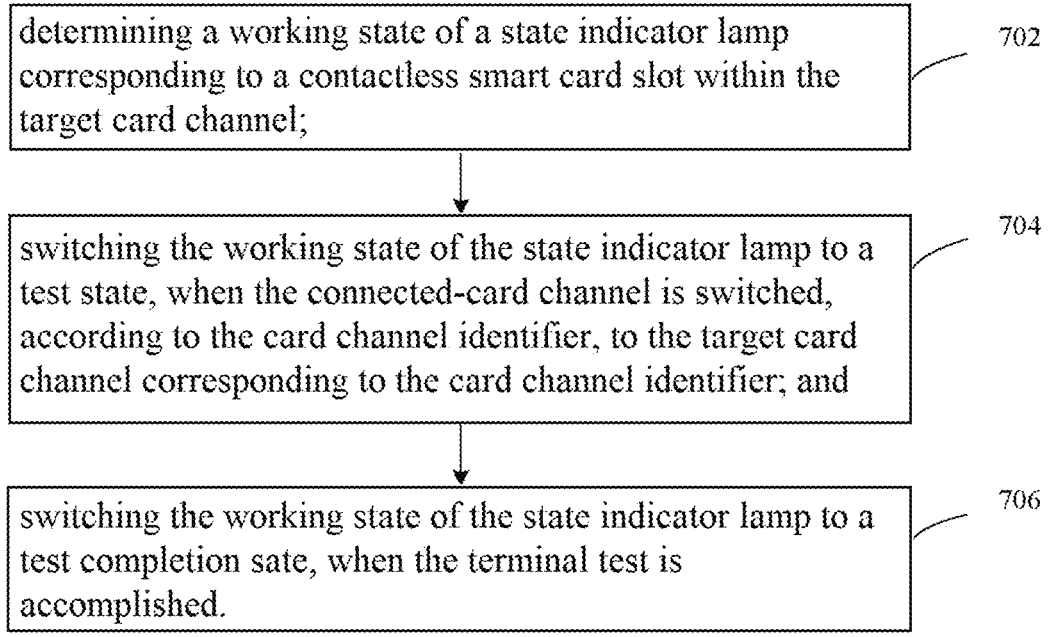
FIG. 7 is a schematic flowchart of a step of switching a working state of a state indicator lamp according to an embodiment of the present application.

As shown in FIG. 7, in an embodiment, the terminal testing method further includes a step of switching a working state of a state indicator lamp, which particularly includes: steps 702, 704, and 706.

In step 702, it is determined a working state of a state indicator lamp corresponding to a contactless smart card slot within the target card channel.

The state indicator lamp may be an indicator lamp representing the processing progress of the smart card in the smart card slot by the master controller. The working state can be the lamp color state when the state indicator lamp is working.

In particular, the first relay repeater exists in the card channel, the first relay repeater is connected to the contactless smart card slot, and the contactless smart card is placed in the contactless smart card slot. Each contactless smart card slot corresponds to a state indicator lamp. The master controller searches a state indicator lamp corresponding to the contactless smart card slot in the target card channel, and obtains the working state of the state indicator lamp. In such condition, the working state of the state indicator lamp can be an initial state.

In step 704, when the connected-card channel is switched, according to the card channel identifier, to the target card channel corresponding to the card channel identifier, the working state of the state indicator lamp is switched to a test state.

The test state may be the working state of the state indicator lamp when the master controller is testing the terminal through the smart card.

In particular, when the master controller detects that the connected-card channel has been switched, according to the card channel identifier, to the target card channel corresponding to the card channel identifier, the master controller switches the working state of the state indicator lamp to the test state, indicating that the master controller is testing the terminal through the smart card in the contactless smart card slot corresponding to the state indicator lamp.

In step 706, when the terminal test is accomplished, the working state of the state indicator lamp is switched to a test completion state.

The test completion state can be the working state of the state indicator lamp when the master controller completes the terminal test through the smart card.

In particular, when the master controller detects that the response data has been sent to the terminal through the second relay repeater, and completes the terminal test, the master controller switches the working state of the state indicator lamp to the test completion state, indicating that the master controller has completed the test of the terminal through the smart card within the contactless smart card slot corresponding to the state indicator lamp.

In an embodiment, the master controller is configured with a display screen, and the display screen can be a liquid crystal display (LCD) screen. A user interface (UI) of the display screen can display the terminal testing process. The state indicator lamp appear in the user interface, and the state indicator lamp can be an LCD lamp.

In an embodiment, each contactless smart card slot where the contactless smart card is placed and each contact smart card slot where the contact smart card is placed have state indicator lamps in one-to-one correspondence. The state indicator lamp corresponding to the contact smart card slot is always in an initial state.

For example, when the master controller is powered on, the state indicator lamp corresponding to the contactless smart card slot is in the initial state, and the light color can be gray. When the connected-card channel is switched, according to the card channel identifier, to the target card channel corresponding to the card channel identifier, the working state of the state indicator lamp is switched to the test state. In such condition, the light color can be yellow and the state indicator lamp flashes. When the terminal test is completed, the working state of the state indicator lamp is switched to the test completion state, and in such condition, the light color can be green. When the master controller fails to complete the terminal test, the working state of the state indicator lamp can be switched to a test failure state, and in such condition, the light color can be red.

In this embodiment, when the connected-card channel is switched to the target card channel corresponding to the card channel identifier, the working state of the state indicator lamp is switched to the test state. When the terminal test is completed, the working state of the state indicator lamp is switched to the test completion state, that is, the working state of the state indicator lamp can represent the processing process of the smart chart by the master controller, which simplifies the tester's monitoring of the terminal testing process.

In an embodiment, when the target card channel corresponding to the card channel identifier is a contact card channel, the connected-card channel is switched to a target card channel corresponding to the card channel identifier, which allows the terminal to read data from a smart card to be tested within the target card channel, whereby accomplishing the terminal test.

In particular, when the master controller determines that the target card channel corresponding to the card channel identifier is the contact card channel, the master controller searches in the preset channel switching list for the channel switching mode corresponding to the card channel identifier, adjusts the electric level value of the contact switching circuit according to the channel switching mode searched out, and then switches, according to the adjusted electric level value, the connected-card channel to the target card channel corresponding to the card channel identifier. The contact switching circuit may be a circuit in the terminal testing system that performs the switching of the contact card channel. After the channel switching is completed, the terminal can directly interact with the smart card to be tested in the target card channel, and read data from the smart card to be tested to complete the terminal test.

In an embodiment, the contact smart card slot exists in the contact card channel, the contact smart card is placed in the contact smart card slot, and the contact smart card slot provides a data interface for the contact smart card placed therein.

In this embodiment, when the target card channel corresponding to the card channel identifier is the contact card channel, the connected-card channel is automatically switched to the target card channel corresponding to the card channel identifier, and the process of switching smart cards does not require moving the smart card, thus saving smart card switching time. After the switching is completed, the terminal can directly read data from the smart card to be tested in the target card channel to complete the terminal test, without the operation of inserting and removing the card, which further reduces the test time and improves the test efficiency.

It should be understood that although the steps in the flowcharts of FIGS. 2-7 are shown in sequence according to the arrows, these steps are not necessarily executed in the sequence shown by the arrows. Unless explicitly stated herein, the execution of these steps is not strictly limited to the order, and the steps may be executed in other orders. Moreover, at least a part of the steps in FIGS. 2-7 may include multiple sub-steps or multiple stages. These sub-steps or stages are not necessarily executed and completed at the same time, but may be executed at different times. The order of execution of the steps is not necessarily sequential, but may be performed alternately or alternately with other steps or at least part of sub-steps or stages of other steps.

Figure 8:
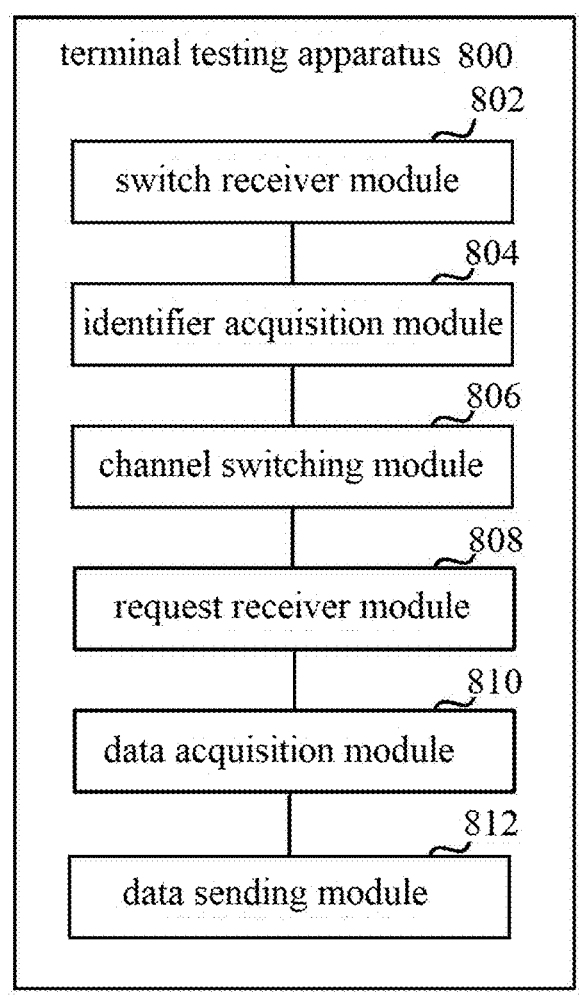
FIG. 8 is a schematic block diagram of an apparatus for testing a terminal according to an embodiment of the present application.

In an embodiment, as shown in FIG. 8, an apparatus 800 for testing a terminal is provided. The apparatus comprises: a switch receiver module 802, an identifier acquisition module 804, a channel switching module 806, a request receiver module 808, a data acquisition module 810, and a data sending module 812.

The switch receiver module 802 is configured for receiving a smart card switching instruction.

The identifier acquisition module 804 is configured for acquiring a card channel identifier from the smart card switching instruction.

The channel switching module 806 is configured for switching a connected-card channel to a target card channel corresponding to the card channel identifier when the target card channel corresponding to the card channel identifier is a contactless card channel.

The request receiver module 808 is configured for receiving a data request for a terminal test.

The data acquisition module 810 is configured for acquiring, through a first relay repeater, response data in response to the data request, from a smart card to be tested within the target card channel.

The data sending module 812 is configured for sending, through a second relay repeater, the response data to the terminal whereby accomplishing the terminal test.

In this embodiment, the card channel identifier is obtained from the received smart card switching instruction. The card channel identifier corresponds to a certain card channel, and in each the card channel is placed one smart card. When the target card channel corresponding to the card channel identifier is the contactless card channel, the connected-card channel is automatically switched to the target card channel corresponding to the card channel identifier. During the switching of the smart card, the smart card can be automatically switched without moving the card, thus saving the time required for switching the smart card. After the switching is completed, the data request for the terminal test is received, response data in response to the data request is read through a first relay repeater from a smart card to be tested within the target card channel, and then, the acquired response data is sent through the second relay repeater to the terminal. In this way, the data interaction between the terminal and the smart card to be tested is realized and the test task is therefore accomplished. Since the operations of inserting and removing the card are not required during the test process, the test time is effectively reduced, and the test efficiency is greatly improved.

In an embodiment, the apparatus 800 for testing a terminal further includes a contact switching mode. The contact switching mode is configured for switching the connected-card channel to a target card channel corresponding to the card channel identifier when the target card channel corresponding to the card channel identifier is a contact card channel, and allowing the terminal to read data from a smart card to be tested within the target card channel, whereby accomplishing the terminal test.

In this embodiment, when the target card channel corresponding to the card channel identifier is the contact card channel, the connected-card channel is automatically switched to the target card channel corresponding to the card channel identifier, and the process of switching smart cards does not require moving the smart card, thus saving smart card switching time. After the switching is completed, the terminal can directly read data from the smart card to be tested in the target card channel to complete the terminal test, without the operation of inserting and removing the card, which further reduces the test time and improves the test efficiency.

In an embodiment, the apparatus 800 for testing a terminal further includes a test determination module and a test stopping module.

The test determination module is configured for determining whether the terminal is currently being tested through a smart card.

The test stopping module is configured for stopping a current test performed on the terminal when it is determined that the terminal is currently being tested via the smart card.

The identifier acquisition module is further configured for acquiring the card channel identifier from the smart card switching instruction after the current test on the terminal is stopped.

In this embodiment, after the smart card switching instruction is received, if the terminal is currently being tested, the current test is stopped, in order to execute the smart card switching instruction, in this way, the test efficiency is ensured and the lagging is avoided.

In an embodiment, the channel switching module 806 is configured for: searching, in a preset channel switching list, for a channel switching mode corresponding to the card channel identifier; adjusting an electric level value of a contactless switching circuit according to the channel switching mode that is searched out; and switching the connected-card channel to the target cart channel corresponding to the card channel identifier according to the electric level value.

In this embodiment, different card channel identifiers correspond to different channel switching modes. The channel switching modes may be based on the electric level value of the contactless switching circuit. The channel switching mode is searched out according to the card channel identifier, and then the electric level value of the contactless switching circuit is adjusted according to the channel switching mode. In this way, the connected-card channel can be accurately switched to the target card channel corresponding to the card channel identifier, thereby improving the switching accuracy of the connected-card channel.

In an embodiment, the apparatus 800 for testing a terminal further includes: a relay starting module and an instruction sending module.

The relay starting module is configured for starting the first relay repeater and the second relay repeater.

The instruction sending module is configured for sending a card searching instruction corresponding to the card channel identifier to the first relay repeat after being started, whereby allowing the first relay repeater to detect a smart cart to be tested within the target card channel according to the card searching instruction.

The request receiver module is further configured for receiving the data request for terminal test when the smart card to be tested within the target card channel is detected.

In this embodiment, the first relay repeater and the second relay repeater are started first, so that the terminal test can be performed normally. The card searching instruction corresponding to the card channel identifier is sent to the first relay repeater after being started, such that it is detected whether the smart card to be tested exists in the target card channel. When the presence of the smart card to be tested is detected, the data request is received, which ensures the normal operation of the terminal test.

In an embodiment, the data acquisition module 810 is configured for: receiving a data request encapsulated by a relay device protocol, and forwarding the data request to the first relay repeater within the target card channel; and receiving the response data capsulated and sent by the first relay repeater. Herein, the data request is configured for instructing the first relay repeater to read the response data in response to the data request, from the smart card to be tested within the target card channel, and encapsulating the response data according to the relay device protocol.

In this embodiment, after the data request encapsulated by the relay device protocol is sent to the first relay repeater in the target card channel, the first relay repeater reads the response data from the smart card to be tested in the target card channel according to the data request, encapsulates the response data according to the relay device protocol, and sends the encapsulated response data to the master controller, thus improving the efficiency of data transmission.

In an embodiment, the apparatus 800 for testing a terminal further includes: a state determination module, a detection-state switching module, and a completion-state switching module.

The state determination module is configured for determining a working state of a state indicator lamp corresponding to a contactless smart card slot within the target card channel.

The detection-state switching module is configured for switching the working state of the state indicator lamp to a test state, when the connected-card channel is switched, according to the card channel identifier, to the target card channel corresponding to the card channel identifier.

The completion-state switching module is configured for switching the working state of the state indicator lamp to a test completion state, when the terminal test is accomplished.

In this embodiment, when the connected-card channel is switched to the target card channel corresponding to the card channel identifier, the working state of the state indicator lamp is switched to the test state. When the terminal test is completed, the working state of the state indicator lamp is switched to the test completion state, that is, the working state of the state indicator lamp can represent the processing process of the smart chart by the master controller, which simplifies the tester's monitoring of the terminal testing process.

For specific limitations on the terminal testing apparatus, reference may be made to the limitations on the terminal testing method above, which will not be repeated here. Each module in the above-mentioned terminal testing apparatus may be implemented in whole or in part by software, hardware and combinations thereof. The above modules can be embedded in or independent of the processor in the computer device in the form of hardware, or stored in the memory in the computer device in the form of software, so that the processor can call and execute the operations corresponding to the above modules.

Figure 9:
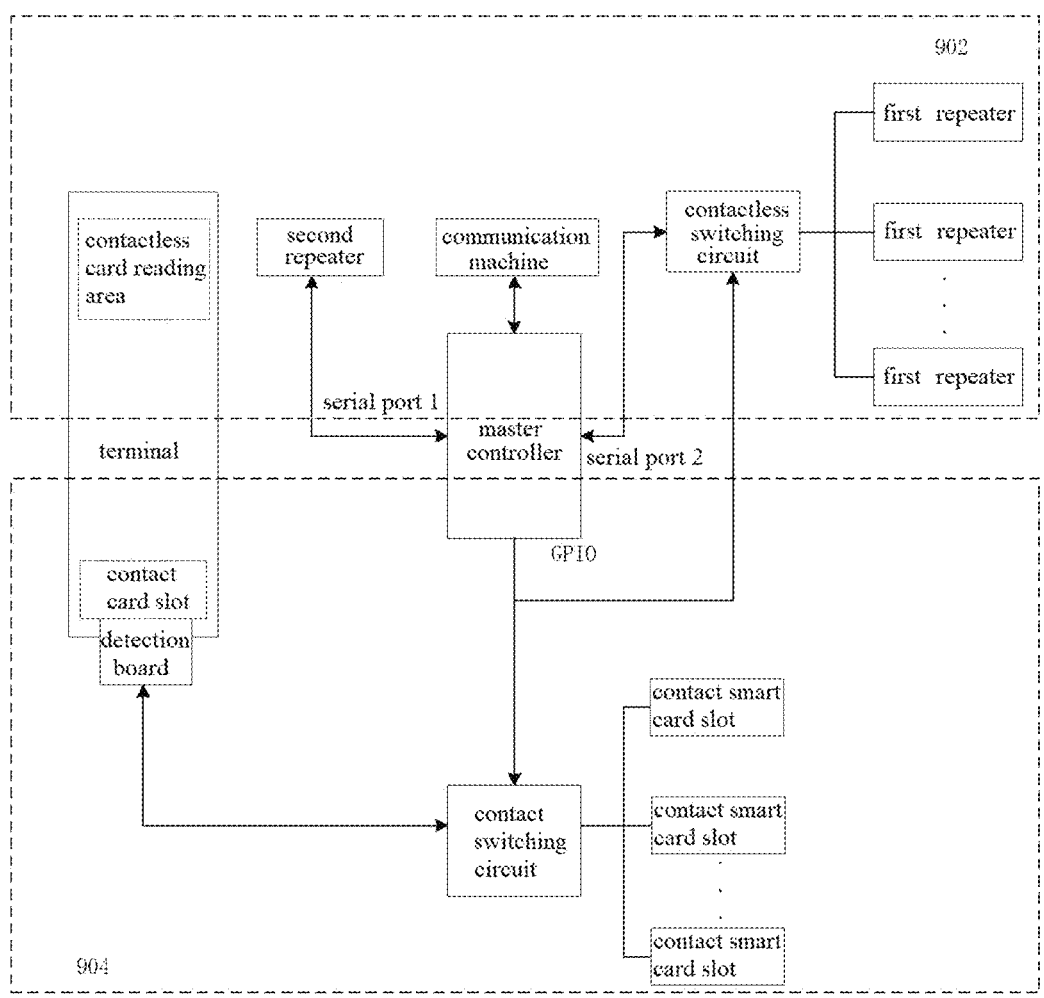
FIG. 9 is a functional block diagram of a system for testing a terminal according to an embodiment of the present application.

In an embodiment, as shown in FIG. 9, a system 900 for testing a terminal is provided. In particular, when the target card channel corresponding to the card channel identifier is a contactless card channel, the terminal testing system 902 as shown in FIG. 9 includes: a terminal, a master controller, a first repeater, a second repeater, a communication machine, and a contactless switching circuit.

The terminal includes a contactless card reading area and a contact card slot. The contactless card reading area is configured for interacting with a contactless smart card, and the contact card slot is configured for allowing a contact smart card to be inserted therein and interacting with the contact smart card. The second relay repeater is placed in the contactless card reading area of the terminal. The master controller is connected with the second relay repeater through a serial port 1, and is connected with the contactless switching circuit through a serial port 2 and a GPIO interface, and the master controller is also connected with the communication machine. The contactless switching circuit is further connected with a plurality of card channels, each of the card channels has one first relay repeater, a contactless smart card slot is placed in each first relay repeater, and one contactless smart card slot is placed within the contactless smart card.

Figure 10:
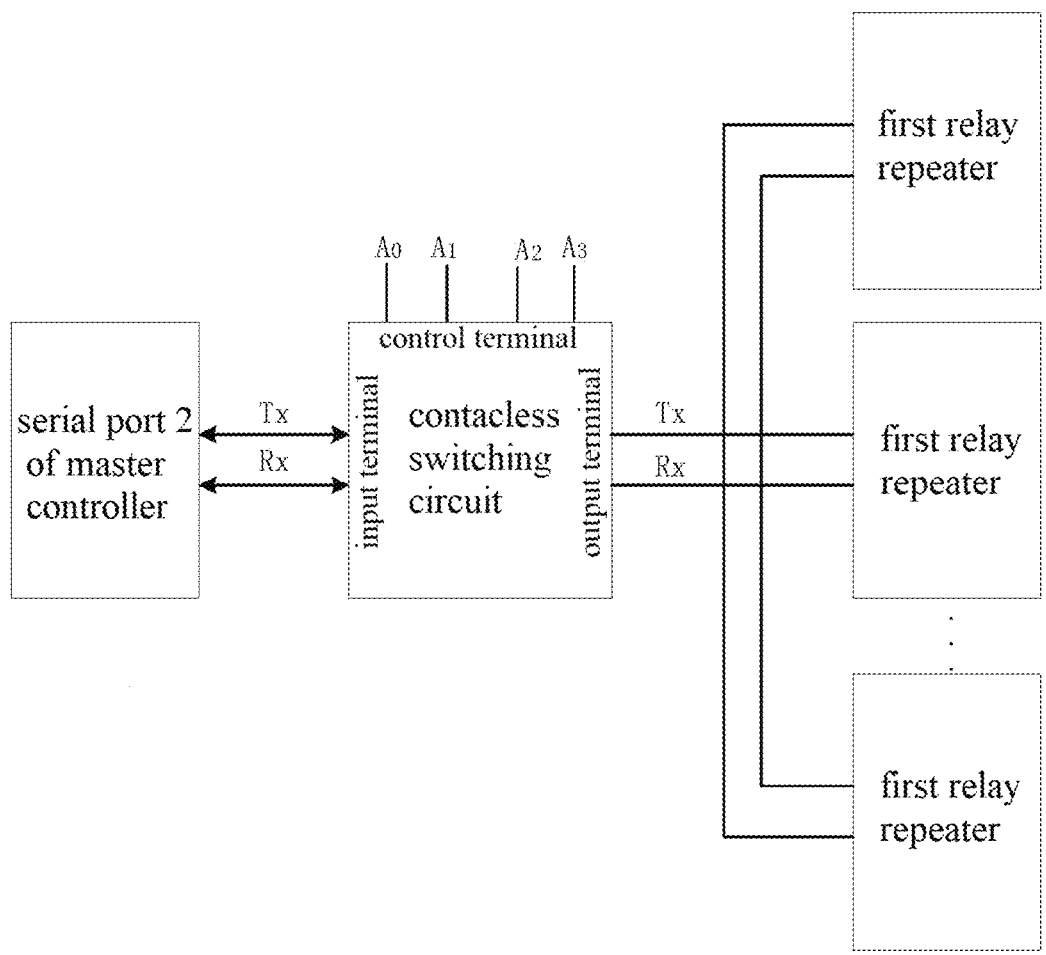
FIG. 10 is a schematic diagram of a contactless switching circuit according to an embodiment of the present application.

In an embodiment, as shown in FIG. 10, a contactless switching circuit is provided. In particular, referring to FIG. 10, an input terminal of the contactless switching circuit is connected to the serial port 2 of the master controller through signal lines Tx and Rx. An output terminal of the contactless switching circuit is connected to the first relay repeaters through signal lines Tx and Rx. The control end of the contactless switching circuit includes four signal lines A0, A1, A2 and A3, which are connected to the GPIO interface of the master controller. The four signal lines A0, A1, A2 and A3 at most have 16 changes of electric levels, thus, the output terminal of the contactless switching circuit can be connected to a maximum of 16 first relay repeaters.

In particular, referring to both FIGS. 9-10, the terminal sends the generated smart card switching instruction to the second relay repeater, and the second relay repeater sends the smart card switching instruction to the master controller through the serial port 1 of the master controller. In addition, the terminal can also establish a WiFi connection with the master controller through the communication machine, and send the smart card switching instruction to the master controller through the communication machine.

The master controller obtains the card channel identifier from the smart card switching instruction. When the target card channel corresponding to the card channel identifier is a contactless card channel, the master controller searches in the preset channel switching list for the channel switching mode corresponding to the card channel identifier, adjusts the electric level value of the control terminal in the contactless switching circuit according to the channel switching mode searched out. The contactless switching circuit switches the connected-card channel to the target card channel corresponding to the card channel identifier according to the electric level value of the control terminal. The connected-card channel can be a circuit structure from the output terminal of the contactless switching circuit to the first relay repeater, or can be a circuit structure from the serial port 2 of the master controller to the first relay repeater. For example, the card channel identifier is N1, where N means the card channel is the contactless card channel, and 1 means a card channel 1 in the contactless card channels. The master controller sets the electric level values of the control terminals A0, A1, A2 and A3 of the contactless switching circuit to 0 according to the channel switching mode corresponding to the card channel identifier N1, then the signal lines Tx and Rx at the serial port 2 of the master controller are respectively connected with the signal lines Tx and Rx of a first relay repeater in the card channel corresponding to the card channel identifier N1, and the channel switching is completed.

The terminal generates a data request for terminal testing, encapsulates the data request according to the relay device protocol and sends the encapsulated data request to the second relay repeater. The second relay repeater sends the encapsulated data request to the master controller through THE serial port 1. The master controller sends the encapsulated data request to a first relay repeater in the target card channel corresponding to the card channel identifier through the serial port 2. The first relay repeater reads the response data from the contactless smart card according to the data request, and encapsulate the response data according to the relay device protocol, and send the encapsulated response data to the master controller through the serial port 2.

The master controller sends the encapsulated response data to the second relay repeater through the serial port 1. The second relay repeater sends the encapsulated response data to the terminal, so as to realize the interaction between the terminal and the smart card in the target card channel corresponding to the card channel identifier, and to complete the terminal testing.

After a test is completed, the terminal can regenerate the smart card switching instruction containing the card channel identifier and send the smart card switching instruction to the master controller.

In another embodiment, when the smart card is the contact smart card, the terminal testing system 904 as shown in FIG. 9 includes: a terminal, a master controller, a detection board, a contact switching circuit, and a contact smart card slot.

The detection board is configured to be inserted into the contact card slot of the terminal, and the contact signal line of the contact card slot can be drawn out and extended to be connected to the input terminal of the contact switching circuit. The detection board can be a probe detection board. When the smart card to be tested is a contact smart card, the contact smart card slot provides a data interface for the smart card to be tested. The signal lines Vcc, I/O, CLK and RST of the contact smart card slot are respectively connected to the signal lines Vcc, I/O, CLK and RST drawn from the detection board. The master controller is connected with the contact switching circuit through the GPIO interface, and the master controller is also connected with the communication machine. The contact switching circuit is also connected with a plurality of contact card channels, one contact smart card slot is provided in each contact card channel, and one contact smart card can be placed in each contact smart card slot.

Figure 11:
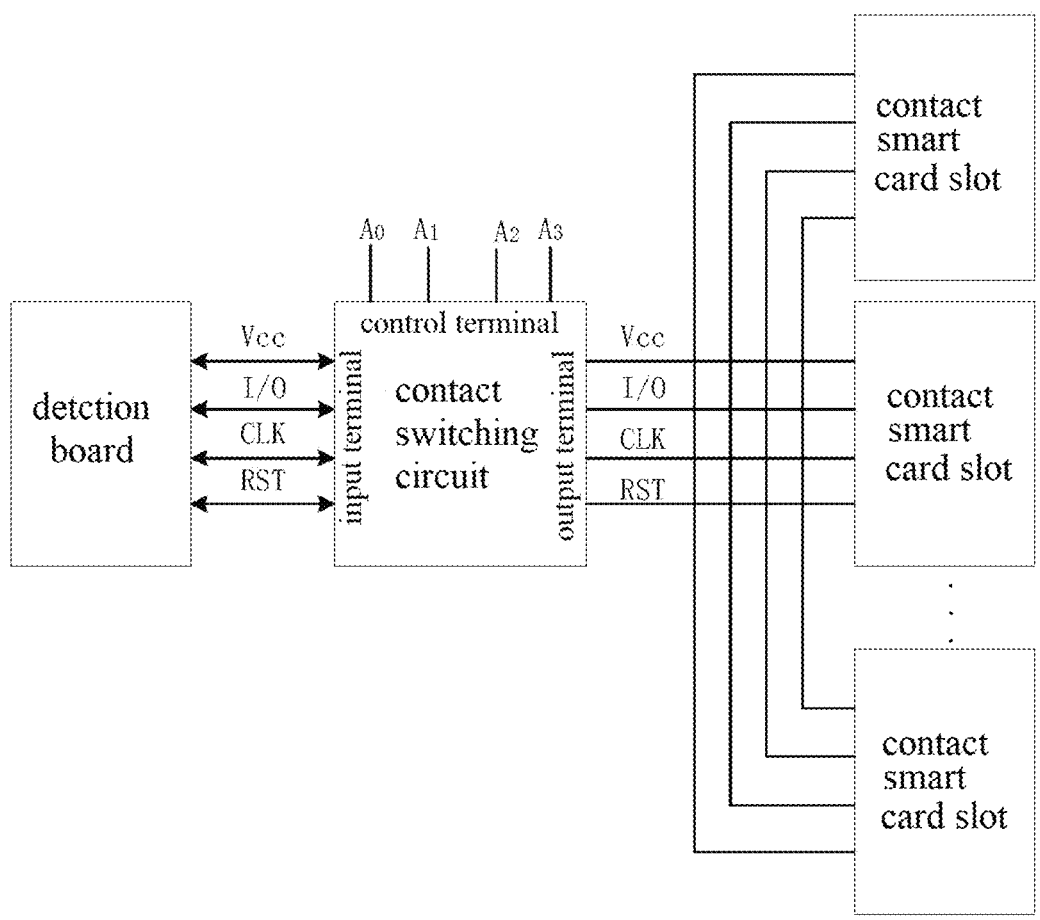
FIG. 11 is a schematic diagram of a contact switching circuit according to an embodiment of the present application.

In an embodiment, as shown in FIG. 11, a contact switching circuit is provided. In particular, referring to FIG. 11, an input terminal of the contact switching circuit is connected to the detection board through signal lines Vcc, I/O, CLK and RST; an output terminal of the contact switching circuit is connected to the contact smart card slots through signal lines Vcc, CLK and RST; and a control end of the contact switching circuit includes four signal lines A0, A1, A2 and A3, which are connected to the GPIO interface of the master controller. The four signal lines A0, A1, A2 and A3 have a maximum of 16 level changes, so that the output terminal of the contact switching circuit can be connected to a maximum of 16 contact smart card slots.

In particular, referring to both FIGS. 9 and 11, the terminal sends a smart card switching instruction to the master controller. The master controller obtains the card channel identifier from the smart card switching instruction. When the target card channel corresponding to the card channel identifier is a contact card channel, the master controller searches in the preset channel switching list for the channel switching mode corresponding to the card channel identifier, adjusts the electric level value of the control terminal in the contact switching circuit according to the channel switching mode searched out. The contact switching circuit switches the connected-card channel to the target card channel corresponding to the card channel identifier according to the electric level value of the control terminal. The connected-card channel can be a circuit structure from the output terminal of the contact switching circuit to the contact smart card slot, or can be a circuit structure from the detection board to the contact smart card slot. For example, the card channel identifier is Y1, where Y means the card channel is a contact card channel, 1 means a card channel 1 in the contact card channels. The master controller sets the electric level values of the control terminals A0, A1, A2 and A3 in the contact switching circuit to be 0, according to the channel switching mode corresponding to the card channel identifier Y1, and in such condition, the signal lines Vcc, I/O, CLK and RST of the detection board are respectively connected to signal lines Vcc, I/O, CLK and RST of the contact smart card slot in the corresponding the card channel, and the channel switching is completed.

The terminal can directly obtain data from the smart card to be tested in the contact smart card slot through the connected signal lines Vcc, I/O, CLK and RST to complete the terminal testing.

Figure 12:
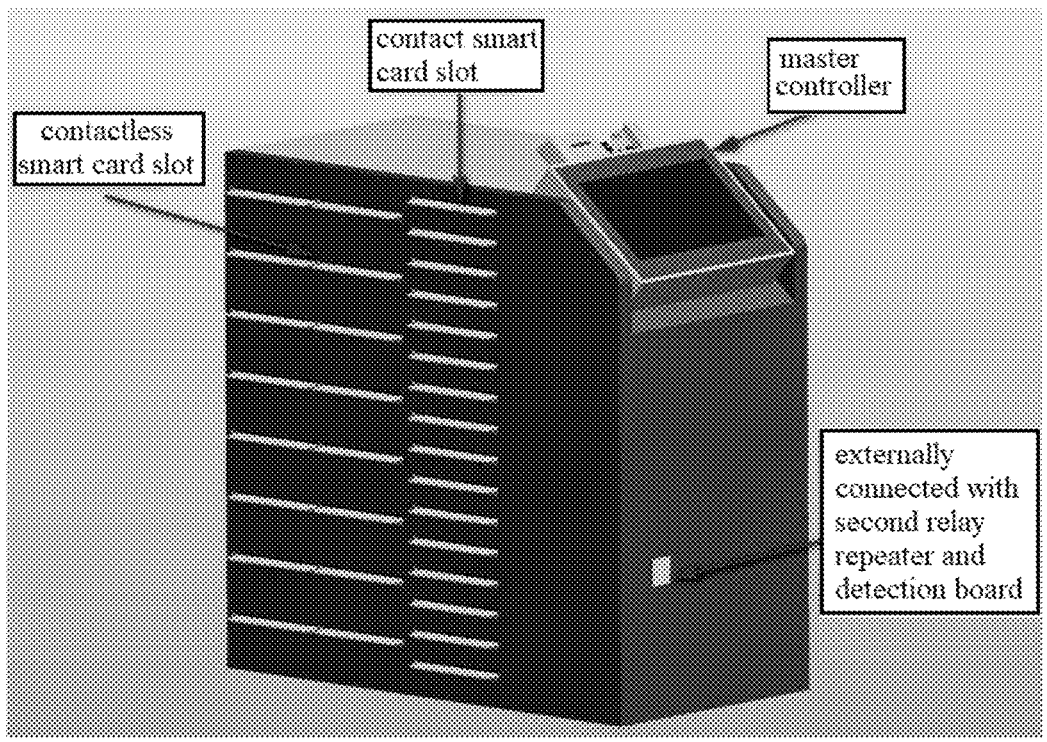
FIG. 12 is a schematic diagram of a terminal testing cabinet according to an embodiment of the present application.

In an embodiment, as shown in FIG. 12, a terminal testing cabinet is provided. The cabinet is used to accommodate the master controller, the contactless switching circuit and the contact switching circuit, a power adapter, the contactless smart card slots, the contact smart card slots, and the USB interfaces. The USB interfaces are used to connect the second relay repeater and the detection board, and can also be used to download application control programs and to export log information recorded when the master controller is running.

Figure 13:
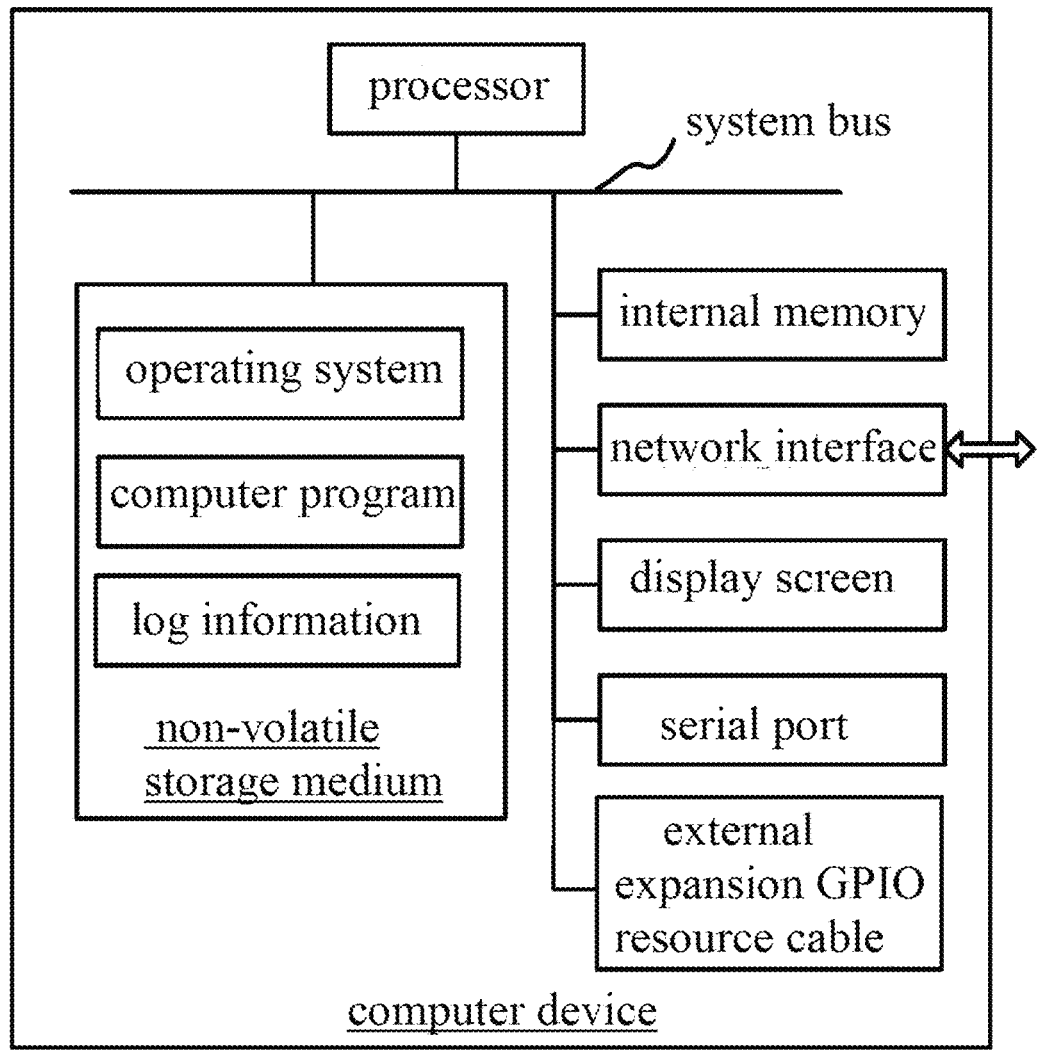
FIG. 13 is an internal structure diagram of a computer device according to an embodiment of the present application.

In an embodiment, a computer device is provided, the computer device may be the master controller, and its internal structure diagram may be as shown in FIG. 13. The computer device includes: a processor, a memory, a network interface, a display screen, and an input device, which are connected by a system bus. The processor of the computer device is used to provide computing and control capabilities. The memory of the computer device includes a non-volatile storage medium and an internal memory. The nonvolatile storage medium stores an operating system, a computer program, and log information. The computer program can be an application control program, which is configured to perform switching of the connected-card channel, test the terminal, and record log information. The internal memory provides an environment for running the operating system and the application control program in the non-volatile storage medium. The network interface of the computer device is connected with the communication machine, which can communicate with external terminals through a network connection. The computer program, when executed by the processor, implements a method for testing a terminal. The display screen of the computer device can be a liquid crystal display (LCD). The serial port of the computer device is configured to connect the first relay repeater and the second relay repeater. The external expansion GPIO resource cables of the computer device are configured to connect the master controller and with the contactless switching circuit, and connect the master controller with the contact switching circuit, so as to control the switching of the connected-card channel.

Those skilled in the art can understand that the structure shown in FIG. 13 is only a block diagram of a partial structure related to the technical solution of the present application, and does not constitute a limitation on the computer device to which the technical solution of the present application is applied. A particular computer device may include more or fewer components than are shown in the figures, or combine with certain components, or have a different arrangement of components.

In an embodiment, a computer device is provided. The computer device includes a memory and a processor. The memory stores a computer program, which, when being executed by the processor, causes the processor executes the steps of the above terminal testing method. The steps of the terminal testing method here may be the steps in the terminal testing methods of the above embodiments.

In an embodiment, a computer-readable storage medium is provided. The computer-readable storage medium stores a computer program, which, when being executed by the processor, causes the processor executes the steps of the above terminal testing method. The steps of the terminal testing method here may be the steps in the terminal testing methods of the above embodiments.

Those ordinary skills in the art can understand that all or part of the processes in the methods of the above embodiments can be implemented by instructing relevant hardware through a computer program, and the computer program can be stored in a non-volatile computer-readable storage medium. When being executed, the computer program may include the processes of the above-mentioned method embodiments. Any reference to the memory, the storage, the database or other medium used in the various embodiments provided in this application may include non-volatile and/or volatile memory. Nonvolatile memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration but not limitation, RAM is available in various forms such as static RAM (SRAM), dynamic RAM (DRAM), synchronous DRAM (SDRAM), double data rate SDRAM (DDRSDRAM), enhanced SDRAM (ESDRAM), synchronous chain Road (Synchlink) DRAM (SLDRAM), memory bus (Rambus) direct RAM (RDRAM), direct memory bus dynamic RAM (DRDRAM), and memory bus dynamic RAM (RDRAM) and so on.

The technical features of the above embodiments can be combined arbitrarily. For the sake of brevity, not all possible combinations of the technical features in the above embodiments are described. However, as long as there is no contradiction in the combination of these technical features, all the possible combinations are considered to be within the range described in this specification.

The above-mentioned embodiments only represent several embodiments of the present application, and the descriptions thereof are relatively specific and detailed, but should not be construed as a limitation on the scope of the present application. It should be noted that, for those skilled in the art, without departing from the concept of the present application, several modifications and improvements can be made, which all belong to the protection scope of the present application. Therefore, the protection scope of the present application shall be subject to the appended claims.

What is claimed is:

1. A method for testing a terminal, being applied to a master controller, the terminal being provided with a plurality of card channels, with each of the plurality of card channels having a card channel identifier, which is a unique identifier for each of the plurality of card channels; and the plurality of card channels comprising: contactless card channels configured to accommodate contactless cards, respectively, and contact card channels configured to accommodate contact cards, respectively; and the method comprising:
receiving, by the master controller, a smart card switching instruction sent from the terminal;
acquiring, by the master controller, a card channel identifier from the smart card switching instruction;

determining, by the master controller, according to the card channel identifier whether a contactless card channel or a contact card channel is to be switched to, and switching, by the master controller, according to the card channel identifier, a connected-card channel to a target card channel corresponding to the card channel identifier, wherein the connected-card channel is a card channel that is being connected with the master controller currently, and the target card channel is a card channel that is to be connected with the master controller;

receiving, by the master controller, a data request for a terminal test sent from the terminal;

acquiring, by the master controller, through a first relay repeater, response data in response to the data request, from a smart card to be tested within the target card channel; and sending, by the master controller, through a second relay repeater, the response data to the terminal whereby accomplishing the terminal test.

2. The method according to claim 1, after receiving the smart card switching instruction, the method further comprising:

determining whether the terminal is currently being tested through a smart card;

stopping a current test performed on the terminal when it is determined that the terminal is currently being tested via the smart card; and executing the step of acquiring the card channel identifier from the smart card switching instruction after the current test on the terminal is stopped.

3. The method according to claim 1, wherein said switching the connected-card channel to the target card channel corresponding to the card channel identifier comprises:

searching, in a preset channel switching list, for a channel switching mode corresponding to the card channel identifier;

adjusting an electric level value of a contactless switching circuit or a contact switching circuit according to the channel switching mode that is searched out; and switching the connected-card channel to the target cart channel corresponding to the card channel identifier according to the electric level value.

4. The method according to claim 1, after said switching the connected-card channel to the target card channel corresponding to the card channel identifier, the method further comprising:

starting the first relay repeater and the second relay repeater;

sending a card searching instruction corresponding to the card channel identifier to the first relay repeat after being started, whereby allowing the first relay repeater to detect a smart cart to be tested within the target card channel according to the card searching instruction; and performing the step of receiving the data request for terminal test when the smart card to be tested within the target card channel is detected.

5. The method according to claim 4, wherein the acquiring, through the first relay repeater, of response data in response to the data request, from the smart card to be tested within the target card channel comprises:

receiving a data request encapsulated by a relay device protocol, and forwarding the data request to the first relay repeater within the target card channel; wherein the data request is configured for instructing the first relay repeater to read the response data in response to the data request, from the smart card to be tested within the target card channel, and encapsulating the response data according to the relay device protocol; and receiving the response data capsulated and sent by the first relay repeater.

6. The method according to claim 1, further comprising:

determining a working state of a state indicator lamp corresponding to a contactless smart card slot within the target card channel;

switching the working state of the state indicator lamp to a test state, when the connected-card channel is switched, according to the card channel identifier, to the target card channel corresponding to the card channel identifier; and switching the working state of the state indicator lamp to a test completion state, when the terminal test is accomplished.

7. A system for testing a terminal, comprising: a terminal, a master controller, a first repeater, and a second repeater;

the terminal being provided with a plurality of card channels, with each of the plurality of card channels having a card channel identifier, which is a unique identifier for each of the plurality of card channels; and the plurality of card channels comprising: contactless card channels configured to accommodate contactless cards, respectively, and contact card channels configured to accommodate contact cards, respectively;

wherein the terminal is configured for:
sending a smart card switching instruction and a data request for terminal test;

the master controller is configured for:
receiving the smart card switching instruction;
acquiring a card channel identifier from the smart card switching instruction;
determining according to the card channel identifier whether a contactless card channel or a contact card channel is to be switched to, and switching according to the card channel identifier a connected-card channel to a target card channel corresponding to the card channel identifier, wherein the connected-card channel is a card channel that is being connected with the master controller currently, and the target card channel is a card channel that is to be connected with the master controller; and
receiving a data request for a terminal test;

the first relay repeater is configured for:
acquiring response data in response to the data request, from a smart card to be tested within the target card channel, and sending the response data to the master controller; and the second relay repeater is configured for:
sending the response data forwarded by the master controller to the terminal whereby accomplishing the terminal test.

8. The system according to claim 7, further comprising: a contact smart card slot;

wherein
the contact smart card slot is configured for: providing a data interface for the smart card to be tested when the contact smart card slot is a contact smart card;
the master controller is further configured for switching the connected-card channel to a target card channel corresponding to the card channel identifier; and
the terminal is further configured for reading data from a smart card to be tested within the target card channel, whereby accomplishing the terminal test.

9. A computer device, comprising:
a memory;
a processor; and
a computer program, stored by the memory and running on the processor, and configured for implementing a method for testing a terminal, when being executed by the processor;
wherein
the method is applied to a master controller;
the terminal is provided with a plurality of card channels, with each of the plurality of card channels having a card channel identifier, which is a unique identifier for each of the plurality of card channels; and the plurality of card channels comprises: contactless card channels configured to accommodate contactless cards, respectively, and contact card channels configured to accommodate contact cards, respectively;
the method comprises:
receiving, by the master controller, a smart card switching instruction sent from the terminal;
acquiring, by the master controller, a card channel identifier from the smart card switching instruction;
determining, by the master controller, according to the card channel identifier whether a contactless card channel or a contact card channel is to be switched to, and switching, by the master controller, according to the card channel identifier, a connected-card channel to a target card channel corresponding to the card channel identifier, wherein the connected-card channel is a card channel that is being connected with the master controller currently, and the target card channel is a card channel that is to be connected with the master controller;
receiving, by the master controller, a data request for a terminal test sent from the terminal;
acquiring, by the master controller, through a first relay repeater, response data in response to the data request, from a smart card to be tested within the target card channel; and
sending, by the master controller, through a second relay repeater, the response data to the terminal whereby accomplishing the terminal test.

10. The computer device according to claim 9, wherein after receiving the smart card switching instruction, the method further comprises:
determining whether the terminal is currently being tested through a smart card;
stopping a current test performed on the terminal when it is determined that the terminal is currently being tested via the smart card; and
executing the step of acquiring the card channel identifier from the smart card switching instruction after the current test on the terminal is stopped.

11. The computer device according to claim 9, wherein said switching a connected-card channel to a target card channel corresponding to the card channel identifier comprises:
searching, in a preset channel switching list, for a channel switching mode corresponding to the card channel identifier;
adjusting an electric level value of a contactless switching circuit or a contact switching circuit according to the channel switching mode that is searched out; and
switching the connected-card channel to the target cart channel corresponding to the card channel identifier according to the electric level value.

12. The computer device according to claim 9, wherein after said switching the connected-card channel to the target card channel corresponding to the card channel identifier, the method further comprises:
starting the first relay repeater and the second relay repeater;
sending a card searching instruction corresponding to the card channel identifier to the first relay repeat after being started, whereby allowing the first relay repeater to detect a smart cart to be tested within the target card channel according to the card searching instruction; and
performing the step of receiving the data request for terminal test when the smart card to be tested within the target card channel is detected.

13. The computer device according to claim 12, wherein the acquiring, through the first relay repeater, of response data in response to the data request, from the smart card to be tested within the target card channel comprises:
receiving a data request encapsulated by a relay device protocol, and forwarding the data request to the first relay repeater within the target card channel; wherein the data request is configured for instructing the first relay repeater to read the response data in response to the data request, from the smart card to be tested within the target card channel, and encapsulating the response data according to the relay device protocol; and
receiving the response data capsulated and sent by the first relay repeater.

14. The computer device according to claim 9, wherein the method further comprises:
determining a working state of a state indicator lamp corresponding to a contactless smart card slot within the target card channel;
switching the working state of the state indicator lamp to a test state, when the connected-card channel is switched, according to the card channel identifier, to the target card channel corresponding to the card channel identifier; and
switching the working state of the state indicator lamp to a test completion state, when the terminal test is accomplished.

* * * * *